United States Patent
Itoko et al.

(10) Patent No.: US 6,701,196 B2
(45) Date of Patent: Mar. 2, 2004

(54) METHOD AND APPARATUS FOR AUTOMATIC POSITION-FINDING ASSEMBLING

(75) Inventors: Toshiyuki Itoko, Noda (JP); Keizo Miyahara, Noda (JP); Hiroaki Kagaya, Noda (JP); Jun Fujimori, Noda (JP)

(73) Assignee: Kawaskai Jukogyo Kabushiki Kaisha, Kobe (JP)

( * ) Notice: Subject to any disclaimer, the term of this patent is extended or adjusted under 35 U.S.C. 154(b) by 293 days.

(21) Appl. No.: 09/740,059

(22) Filed: Dec. 20, 2000

(65) Prior Publication Data

US 2001/0005818 A1 Jun. 28, 2001

(30) Foreign Application Priority Data

Dec. 27, 1999 (JP) .......................................... 11-369350

(51) Int. Cl.$^7$ .............................................. G05B 19/25
(52) U.S. Cl. ........................................... 700/57; 700/62
(58) Field of Search ............................... 700/56, 57, 61, 700/62, 95, 114, 245, 253, 255, 260, 193; 318/570; 319/568.11, 568.21, 568.22, 568.2, 567, 576; 901/29, 42

(56) References Cited

U.S. PATENT DOCUMENTS

| 4,564,994 | A | * | 1/1986 | Marx ............................ 29/468 |
| 4,610,084 | A | | 9/1986 | Anderson et al. |
| 5,023,533 | A | * | 6/1991 | Ishikawa et al. ........ 318/568.21 |
| 5,104,162 | A | * | 4/1992 | Watanabe ..................... 29/274 |
| 5,180,955 | A | * | 1/1993 | Karidis et al. ............ 318/568.1 |
| 5,619,782 | A | | 4/1997 | Tanaka et al. |
| 5,794,339 | A | | 8/1998 | Pearson et al. |
| 5,839,182 | A | * | 11/1998 | Murata et al. ................. 29/464 |
| 6,021,361 | A | * | 2/2000 | Taninaga et al. ............. 700/182 |
| 6,294,890 | B1 | * | 9/2001 | Shimada et al. ............. 318/570 |

FOREIGN PATENT DOCUMENTS

| DE | 2 400 596 | | 8/1974 | |
| JP | A 57-184639 | | 11/1982 | |
| JP | A 62-204035 | | 9/1987 | |
| JP | A 3-94312 | | 4/1991 | |
| JP | A 7-241733 | | 9/1995 | |
| JP | 7241733 | * | 9/1995 | ........... B23P/19/02 |
| JP | A 8-168927 | | 7/1996 | |
| JP | A 9-108960 | | 4/1997 | |

OTHER PUBLICATIONS

The American Heritage Dictionary of the English Language, 4th edition, Houghton Mifflin Company, definition #1.*
Eric W. Weisstein, Eric Weisstein's World of Mathematics 1999, CRC Press LLC.*

* cited by examiner

*Primary Examiner*—Leo Picard
*Assistant Examiner*—Sean P. Shechtman
(74) *Attorney, Agent, or Firm*—Oliff & Berridge, PLC (57) ABSTRACT

A control unit (14) makes an end effector (10) compliant with respect to an x-axis and a y-axis which are perpendicular to a z-axis parallel to a direction in which a shaft (20) is moved for insertion and makes the end effector (10) produce a pressing force acting in a direction parallel to the z-axis to press the shaft (20) against an internally toothed disk (22). The control unit (14) moves the compliance center of the shaft (20) along a predetermined groping route in a state where the pressing force acting in the direction parallel to the z-axis is produced by the end effector (10). The shaft (20) gripped by the end effector (10) repeats radially outward movement from a position near the center of the center opening (22b) of the internally toothed disk (22) in different phases in an xy plane defined by the x-axis and the y-axis to find a position where the splines (20a) of the shaft (20) are able to engage the internal teeth (22a) of the outermost internally toothed disk (22). If the shaft (20) stays at the same z position for a predetermined time, the control unit (14) instruct the end effector (10) to reduce the pressing force for a predetermined time to separate the shaft (20) temporarily from the internally toothed disk (22) and to resume moving the shaft (20) along the groping route.

12 Claims, 4 Drawing Sheets

METHOD AND APPARATUS FOR AUTOMATIC POSITION-FINDING ASSEMBLING

BACKGROUND OF THE INVENTION

1. Field of the Invention

The present invention relates to an assembling method to be carried out by an assembling robot and, more particularly, to an automatic position-finding assembling method for inserting an insert member into a mating hole of a receiving fib when assembling a predetermined assembly, and an automatic position-finding assembling apparatus for carrying out the method.

2. Description of the Related Art

A multiple disk clutch is one of assemblies that are assembled by a position-finding assembling method. The multiple disk clutch is formed by alternately placing inner disks (receiving members), i.e., internally toothed disks, and outer disks, i.e., externally toothed disks, in a space defined by a cylindrical member. Both the inner disks and the outer disks are flat annular members and have center openings, respectively. Each of the inner disks is provided with a plurality of internal teeth on its inner circumference while each of the outer disks is provided with a plurality of external teeth on its outer circumference. The inner circumferences of the inner disk and the outer disks form a substantially cylindrical space. A shaft (insert member) provided on its outer surface with a plurality of axial splines is inserted in the substantially cylindrical space with the splines thereof engaging the internal teeth of the inner disks. The cylindrical member is provided in its inner circumference with a plurality of grooves. The external teeth of the outer disks engage the plurality of grooves of the cylindrical member.

When assembling the multiple disk clutch, the inner disks and the outer disks are inserted alternately in the space in the cylindrical member with the external teeth of the outer disks engaging the grooves of the cylindrical member, and then the shaft is inserted in the substantially cylindrical space defined by the inner and the outer disks. More concretely, the shaft is turned properly to find an angular position where the splines of the shaft are able to engage the internal teeth of the outermost inner disk, and the shaft is inserted in the center opening of the outermost inner disk. Subsequently, the shaft is advanced into the substantially cylindrical space and the shaft is turned together with the outermost inner disk engaged with the shaft and is properly moved axially back and forth to find an angular position where the spines of the shaft are able to engage the internal teeth of the second outermost inner disk. Thus, an operation for finding an engaging position where the splines of the shaft are able to engage the internal teeth of the inner disk and an operation for inserting the shaft into the center opening of the inner disk are repeated alternately to assemble the multiple disk clutch.

When thus assembling the multiple disk clutch, the inner disks are not restrained at all from movement in the cylindrical member and the positions and the angular positions of the inner disks are variable before the shaft is inserted in the inner disks. Consequently, the inner disks move away from the shaft and the internal teeth of the inner disks are dislocated from an engaging position where the same are able to engage the splines of the shaft. Therefore, operations for finding an engaging position where the splines of the shaft are able to engage the internal teeth of the inner disks and for pushing the shaft into the openings of the inner disks must unavoidably depend on the feeling of a skilled hand.

Attempts have been made to carry out such assembling operations automatically by an assembling robot. An assembling method that guides a shaft, i.e., an insert member, into the tapered receiving hole of a workpiece, i.e., a receiving member, and an assembling method that aligns an insert member with the receiving hole of a receiving member by a simple groping reciprocating operation of a mechanism are proposed in JP-A Nos. 57-184639 and 62-204035.

Although the prior art assembling method that tapers the receiving hole of a workpiece is effective in expanding the range of positions of the insert member relative to the receiving hole of the receiving member where the insert member can be inserted in the receiving hole, this assembling method require subjecting the receiving member to a functionally unnecessary machining process and requires changes in design. The assembling method that uses simple groping reciprocating operation needs a special hand for assembling an assembly of an insert member and a receiving member, and needs different special hands for assembling different assemblies. When the assembling mood that uses the simple groping reciprocation is applied to assembling, for example, a multiple disk clutch, friction disks are liable to move together with a shaft or the shaft is liable to be caught by the friction disks and becomes immovable. Consequently, it takes a long time for finding the internal teeth of the friction plate and hence the assembling work cannot be precisely and quickly carried out.

SUMMARY OF THE INVENTION

The present invention has been made in view of those problems and it is therefore an object of the present invention to provide an automatic position-finding assembling method for assembling an assembly by inserting an insert member into a mating opening of a receiving member, capable of quickly and surely finding an engaging position where the insert member is able to engage the receiving member and of precisely and quickly carrying out assembling work, and an automatic position-finding assembling apparatus for carrying out the method.

According to a first aspect of the present invention, an automatic position-finding assembling method for inserting an insert member held by an end effector of an assembling robot into a mating opening of a receiving member to assemble a predetermined assembly, comprises the steps of: positioning the insert member relative to the mating opening of the receiving member by moving the insert member held by the end effector relative to the receiving member; and pressing the insert member against the receiving member by a pressing force applied to the insert member in a direction parallel to a third axis by the end effector compliant with respect to directions parallel to first and second axes perpendicular to the third axis; wherein in the step of pressing the insert member against the receiving member, the compliance center of the insert member is moved along a predetermined groping route with the pressing force applied to the insert member in the direction parallel to the third axis by the end effector.

In the automatic position-finding assembling method in the first aspect of the present invention, it is preferable that the groping route is set for repetition of a radially outward movement from a position near the center of the mating opening of the receiving member in different phases in a plane defined by the first and the second axes.

In the automatic position-finding assembling method in the first aspect of the present invention, it is preferable that the groping route is a cloverleaf route expressed by the following expressions representing x and y coordinates on a plane defined by the first axis as x-axis and the second axis as y-axis:

$$x = A_x\{\sin(\omega t) + \sin(n\omega t)\}$$

$$y = A_y\{\cos(\omega t) \pm \cos(n\omega t)\}$$

where $A_x$ and $A_y$ are amplitudes (leaf size), n is a real number (relating to number of leaves), ω is a velocity of groping motion and t is time. Please note that n is a real number and not necessarily an integer.

In the step of pressing the insert member against the receiving fiber in the automatic position-finding assembling method in the first aspect of the present invention, it is preferable that the pressing force produced by the end effector is reduced during the movement of the compliance center of the insert member along the grouping route. It is preferable that the insert member held by the end effector is rotated periodically about its axis in the step of pressing the insert member against the receiving member. It is preferable that the compliance is exercised through the compliance control of the end effector.

In the automatic position-finding assembling method in the first aspect of the present invention, it is preferable that the insert member is a shaft having engaging portions formed on its outer circumference, the receiving member includes a plurality of plate-shaped members each having a center opening provided on its circumference with engaging portions mating with the engaging portions of the shaft, and the plurality of plate-shaped members are arranged with the center openings thereof aligned with each other.

According to a second aspect of the present invention, an automatic position-finding assailing apparatus for inserting an insert member into a mating opening of a receiving member by an assembling robot to assemble a predetermined assembly, comprises an end effector for holding the insert member; and a control unit for controlling the operations of the end effector so that the insert member held by the end effector is inserted in the mating opening of the receiving wherein the control unit gives the end effector compliance with respect to directions parallel to first and second axes perpendicular to a third axis extending in a direction in which the insert member is moved for insertion, and a compliance center of the insert member is moved along a predetermined groping route with a pressing force applied to the insert member in a direction parallel to the third axis by the end effector.

According to the present invention, the insert member is pressed against the receiving member by the end effector having a compliance and the compliance center of the insert member is moved along the predetermined groping route. Therefore, the mating opening of the receiving member can be found by actively moving the insert member in the plane perpendicular to the direction of insertion and hence an engaging position where the insertion member is able to engage the receiving member can be surely found in a short time. Since the end effector is compliant, any excessive force is not applied to the insertion member and the receiving member while the insertion member is moved for grouping along the groping route and the breakage of the engaging portions of the insertion member and the receiving member can be prevented.

According to the present invention, the insert member can be temporarily separated from the receiving member and the position finding operation of the insert member can be resumed by temporarily reducing the pressing force exerted on the insert member by the end effector during the position finding operation. Accordingly, the present invention is capable of surely dealing with a case in which the receiving member moves together with the insert member, and the insert member is unable to reach an engaging position where the same is able to engage the mating opening of the receiving member. In other words, the present invention is capable of dealing with a case in which the engaging position where the insert member is able to engage the mating opening of the receiving member cannot be found in a predetermined time.

According to the present invention, the angular misalignment of the engaging portions of the insert member relative to engaging portions of the receiving can be corrected by periodically rotating the insert member held by the end effector about its axis. Consequently, the present invention is capable of surely dealing with a case in which the engaging portions of the insert member are dislocated relative to the engaging portions of the receiving member so greatly that the engaging portions of the insert member cannot be aligned with those of the receiving member by the agency of the compliance of the end effector.

The compliance can be given to the end effector though the compliance control (execution of a control algorithm by the control unit) without providing the end effector with any complicated compliance mechanism, so that the assembling work can be carried out by a simple mechanism.

According to the present invention, the groping route is set for repetition of a radially outward movement from a position near the center of the mating opening of the receiving member in different phases in a predetermined plane. Therefore, the compliance center of the insert member moves radially outward from the position near the center of the mating opening of the receiving member in different phases. Thus, the engaging position where the insert member is able to engage the receiving member can be surely found even if the center of the mating opening of the receiving member is dislocated or the compliance center of the insert member is in contact with a portion of the receiving member and does not correspond to the center opening of the receiving member in an initial state. Particularly, when the groping route is the cloverleaf route expressed by the foregoing functions, the insert member can be smoothly moved, the groping route can be easily set, and even a low-function controller is able to carry out sufficiently precise work because the groping route can be calculated by using simple, handy trigonometric functions to reduce load on the control unit when producing a command signal.

DESCRIPTION OF THE PREFERRED EMBODIMENTS

An automatic position-finding assembling apparatus in a preferred embodiment of the present invention as applied to assembling a multiple disk clutch will be described hereinafter with reference to the accompanying drawings.

The general constitution of the automatic position-finding assembling apparatus will be described with reference to FIGS. 2A and 2B.

Figure 2A:
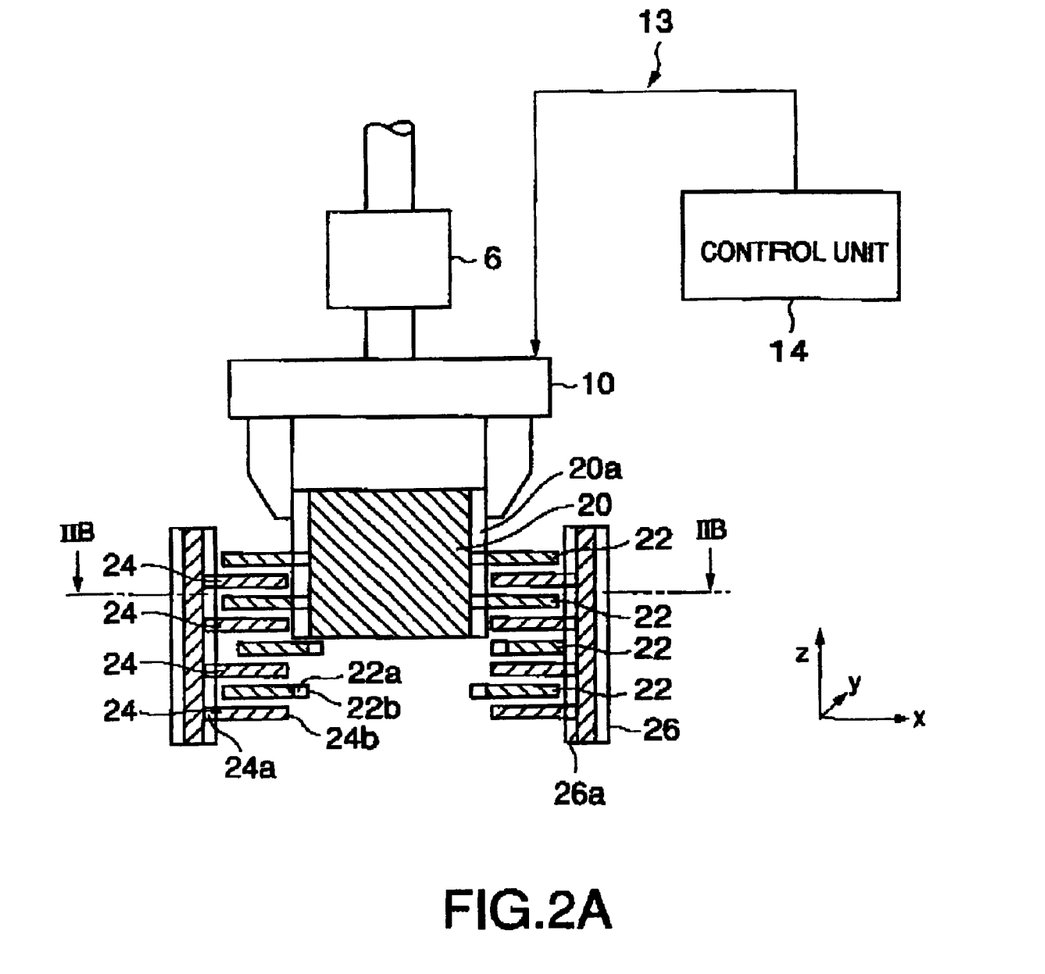
FIG. 2A is a schematic view of an automatic position-finding assembling apparatus in a preferred embodiment of the present invention.

Referring to FIG. 2A, the automatic position-finding assembling apparatus 13 assembles the multiple disk clutch (assembly) by inserting a shaft (insert member) 20 gripped by an end effector 10 included in an assembling robot in center openings 22b of internally toothed disks (receiving member) 22. The automatic position-finding assembling apparatus 13 has the end effector 10 and a control unit 14 for controlling the end effector 10. The end effector 10 is provided with a plurality of actuators, not shown, and the actuators are driven to move the end effector 10 for translation along three axes and rotation relative to the three axes. A force measuring device 6 is placed on a base portion of the end effector 10 to measure forces applied to the end effector 10.

Figure 2B:
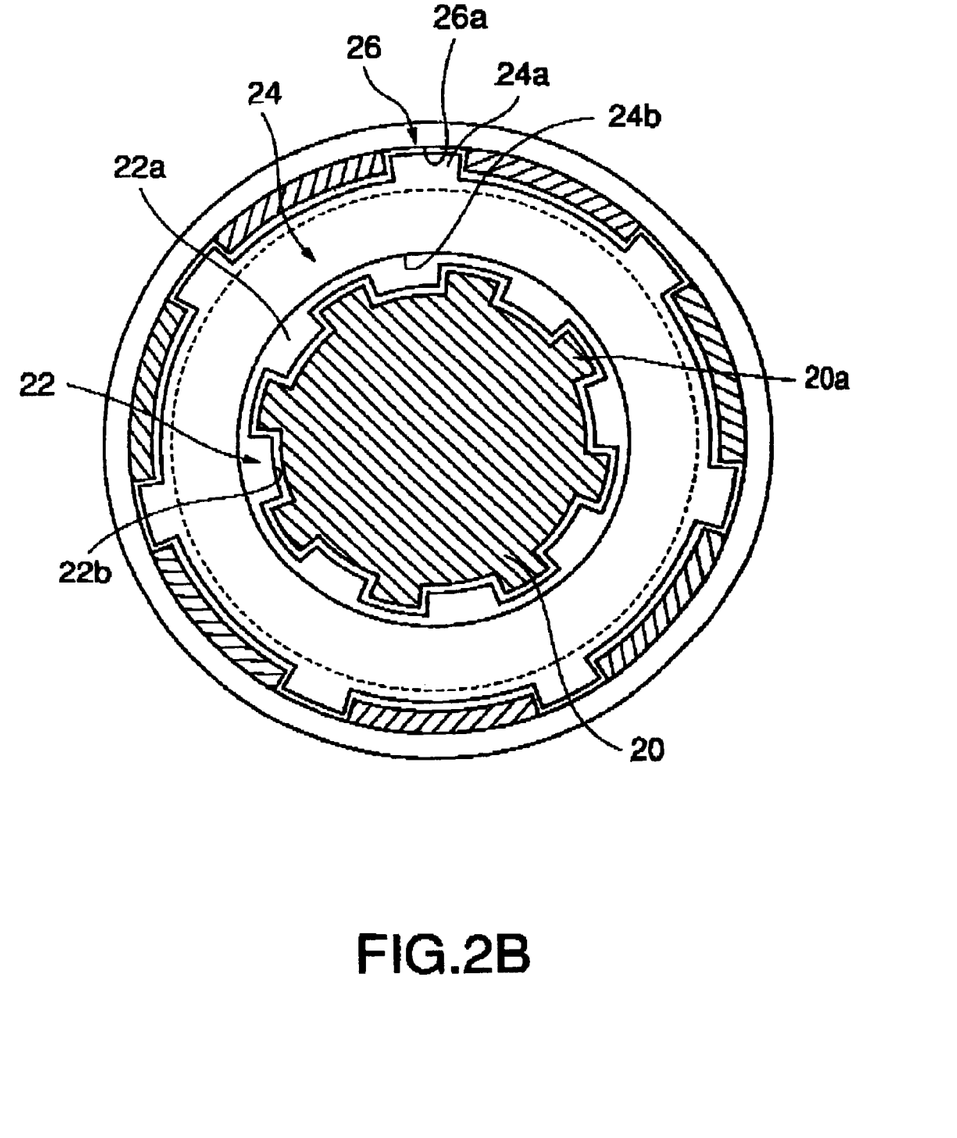
FIG. 2B is a sectional view of a multiple disk clutch to be assembled by the automatic position-finding assembling apparatus shown in FIG. 2A, taken on line IIB—IIB in FIG. 2A.

As shown in FIGS. 2A and 2B, the multiple disk clutch assembled by the automatic position-finding assembling apparatus 13 has a cylindrical member 26, internally toothed disks 22 and externally toothed disks 24. The internally toothed disks 22 and the externally toothed disks 24 are friction disks of different types, respectively. The internally toothed disk 22 and the externally toothed disks 24 are superposed alternately in a space defined by the cylindrical member 26. The internally toothed disks 22 and the externally toothed disks 24 are flat, annular plates and are provided with center openings 22b and 24b, respectively. Each of the internally toothed disks 22 is provided with a plurality of internal teeth (engaging portions) 22a on its inner circumference defining the center opening 22b while each of the externally toothed disks 24 is provided with a plurality of external teeth (engaging portions) 24a on its outer circumference. The center openings 22b and 24b of the internally toothed disks 22 and the externally toothed disks 24 are coaxial. The inner circumferences of the center openings 22b and 24b of the internally toothed disks 22 and the externally toothed disks 24 form a substantially cylindrical space extending through the center openings 22b and 24b of the internally toothed disks 22 and the externally toothed disks 24. A shaft (insert member) 20 provided on its outer surface with a plurality of axial splines (engaging portions) 20a is inserted in the substantially cylindrical space with the splines 20a thereof engaging the internal teeth 22a formed around the center opening 22b of the internally toothed disks 22. The cylindrical meter 26 is provided in its inner circumference with a plurality of axial grooves 26a. The external teeth 24a of the externally toothed disks 24 engage the plurality of axial grooves 24a of the cylindrical member 26.

In a state where the shaft 20 is not inserted in the center opening 22b and 24b of the internally toothed disks 22 and the externally toothed disks 24, the internally toothed disks 22 placed in the cylindrical member 26 are not restrained from engagement and are able to move freely in a horizontal plane perpendicular to a direction in which the shaft 20 is moved for insertion. FIG. 2A shows a state where the shaft 20 is in engagement with the two internally toothed disks 22 and is being moved for groping for the center opening 22b of the third internally toothed disk 22.

A control system included in the automatic position-finding assembling apparatus 13 shown in FIG. 2A will be described with reference to FIG. 1

Figure 1:
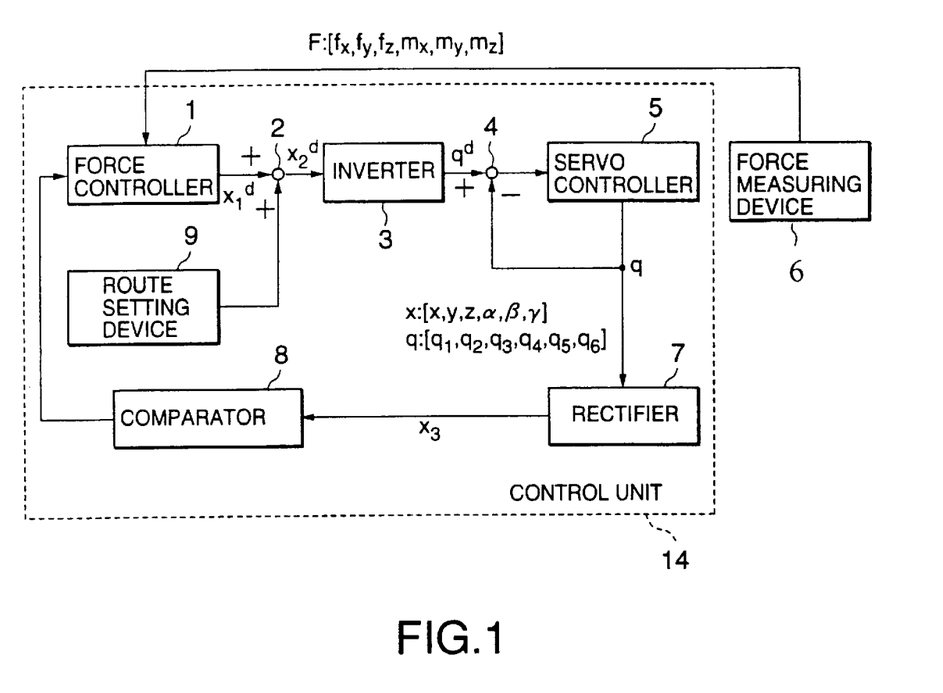
FIG. 1 is a block diagram of a control system employed in an automatic position-finding assembling apparatus in a preferred embodiment of the present invention.

As shown in FIG. 1, the control system of the automatic position-finding assembling apparatus 13 includes the force measuring device 6 for measuring a force applied to the end effector 10, and a control unit 14 that controls the actuators, not shown, for operating the end effector 10 on the basis of a measurement provided by the force measuring device 6.

The force measuring device 6 is capable of measuring axial forces fx, fy and fz along three coordinate axes, i.e., the x-axis, the y-axis and the z-axis and torques mx, my and mz about the axes of rotation parallel to the x-axis, the y-axis and the z-axis. The force measuring device 6 sends measured data to a force controller 1 included in the control unit 14.

The control unit 14 includes the force controller 1, an adder 2, an inverter 3, an adder 4, a servo controller 5, a rectifier 7, a comparator 8 and a route setting device 9.

The force controller 1 determines desired position data $x_1^d$: $(x^d, y^d, z^d, \alpha^d, \beta^d, \gamma^d)$ as command values representing a position and attitude of the end effector 10 on the basis of a force applied to the end effector 10 and measured by the force measuring device 6 according to a control algorithm stored therein, in which x, y and z are coordinates of the end effector 10 in a coordinate system defined by an x-axis, y-axis and z-axis and $\alpha$, $\beta$ and $\gamma$ are angles of rotation of the axis of the end effector 10 with respect to the x-axis, y-axis and z-axis.

The adder 2 adds up the desired position data $x_1^d$ provided by the force controller 1 and a groping route for the shaft 20 set by the route setting device 9 to determine a final desired position data $x_2^d$.

The inverter 3 converts the final desired position data $x_2^d$ provided by the adder 2 into desired working stroke data $q^d$z $(q_1^d, q_2^d, q_3^d, q_4^d, q_5^d, q_6^d)$ indicating desired working strokes of the actuators. When the actuators are rotary machines, such an electric motors, the desired working stroke data $q^d$ are angles of rotation of the driving shafts of the actuators.

The adder 4 receives the desired working stroke data $q^d$ calculated by the inverters 3 and actual working stroke data q: $(q_1, q_2, q_3, q_4, q_5, q_6)$ indicating the actual working strokes of the actuators, and gives the difference between the desired working stroke data and the actual working stroke data as desired differences to the servo controller 5.

The servo controller 5 executes the servo control of the actuators according to the desired working stroke data $q^d$ on the actuators and the actual working stroke data q on the actuators so that the actual working stroke data q on the actuators coincides with the desired working stroke data $q^d$.

The rectifier 7 converts the actual working stroke data q on the actuators into position data $x_3$ on the position and attitude of the end effector 10.

The comparator 8 makes a decision on the basis of the position data $x_3$ provided by the rectifier 7. First, the comparator 8 compares the position z of the shaft 20 on the z-axis with a final desired position $z_{fy}$. If the position z on the z-axis is near the final desired position $z_{fy}$, it is decided that the assembling operation is completed and the comparator 8 gives an assembling operation end signal to the force controller 1. When the position z on the z-axis of the shaft 20 changes scarcely, i.e., $dz \approx 0$, the comparator 8 compares time t of the duration of a state where $dz \approx 0$ with a predetermined time $t_{th}$. If the shaft 20 stays at the same position and the position z of the shaft 20 on the z-axis does not change for the predetermined time $t_{th}$, it is possible that the shaft 20 is stuck on the internally toothed disk 22 and the internally toothed disk 22 is moving together with the shaft 20. Therefore, a signal instructing the force controller 1 to reduce the pressing force parallel to the z-axis for a predetermined time is given to the force controller 1.

The force controller 1 controls the forces exercised by the end effector 10 and executes a compliance control. More concretely, the force controller 1 controls the pressing forces fx and fy parallel to the x-axis (first axis) and the y-axis (second axis) which are parallel to the z-axis (third axis) parallel to the direction of insertion of the shaft 20, and the torques mx and my about the x-axis and the y-axis by the compliance control so that the end effector 10 is compliant with respect to the x-axis and the y-axis. The compliance control tempers force with elasticity, uses greater force for correcting greater deviation and uses smaller force for correcting smaller deviation.

The force controller 1 operates according to a control algorithm and provides a revolution command instructing the end effector 10 to revolve the shaft 20 periodically about the z-axis.

The route setting device 9 controls the position of the end effector 10. The route setting device 9 sets a groping route for the compliance center of the shaft 20 gripped by the end effector 10. The compliance center of the shaft 20 is moved along the predetermined groping route with the shaft 20 pressed against the internally toothed disk 22 by a pressing force parallel to the z-axis applied thereto by the end effector 10.

Coordinates of points on the groping route set by the route setting device 9 can be expressed only by simple trigonometric functions. For example, coordinates of points on a cloverleaf grouping route on an xy plane defined by the x-axis and the y-axis can be expressed by the following expressions.

$$x = A_x\{\sin(\omega t) + \sin(n\omega t)\}$$

$$y = A_y\{\cos(\omega t) \pm \cos(n\omega t)\}$$

where $A_x$ and $A_y$ are amplitudes (leaf size), n is a real number (relating to number of leaves), $\omega$ is a velocity of groping motion and t is time. Please note that n is a real number and not necessarily an integer.

Figure 3:
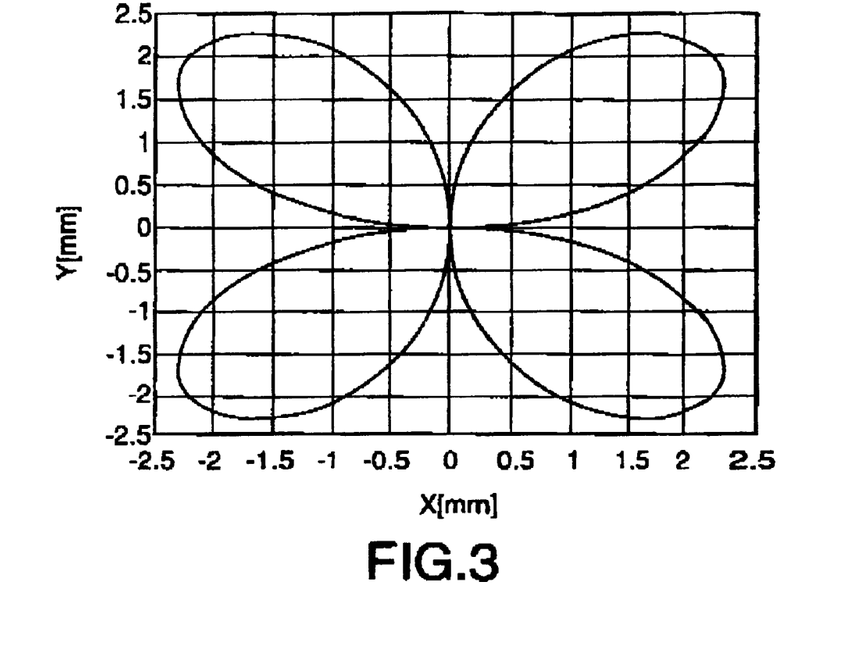
FIG. 3 is a diagram of a groping route along which an end effector of the automatic position-finding assembling apparatus shown in FIG. 2A is moved.

FIG. 3 is a groping route represented by those trigonometric expressions when n=3, $A_x=A_y$, and $y=A_y\{\cos(\omega t)-\cos(n\omega t)\}$. As obvious from FIG. 3, the groping route represented by the foregoing trigonometric expressions requires the repetitive radially outward move of the compliance center of the shaft 20 from a position neat the center of the center opening 22b of the internally toothed disk 22 in different phases in an xy plane defined by the x-axis and the y-axis. Even if an engaging position cannot be found by one cycle of the radially outward movement, an engaging position can be found without fail while the radially outward movement is repeated by a plurality of cycles. If the coefficient n of the foregoing trigonometric expressions is large, the number of cycles of the radially outward movement is large and, in some cases, a long time is necessary for finding the engaging position of the internally toothed disk 22. Since the adjacent paths of the groping route is close to each other, the engaging position of the internally toothed disk 22 can be surely found. The groping route represented by the foregoing trigonometric expressions meets the requirements of the various groping motions of the shaft 20. A grouping route can be defined very simply by specifying values for the amplitude $A_x$ and $A_y$ and the coefficient n, the grouping route can be calculated by simple operations and hence the calculation load is low when producing command signals.

The operation of the automatic position-finding assembling apparatus 13 thus constructed will be described hereinafter.

Referring to FIGS. 2A and 23, the internally toothed disks 22 and the externally toothed disks 24 are arranged alternately in the space defined by the cylindrical member 26 with the external teeth 24a of the externally toothed disks 24 engaging the axial grooves 26a of the cylindrical member 26.

Then, control unit 14 controls the end effector 10 to make the end effector 10 move the shaft 20 gripped by the end effector 10 relative to the outermost internally toothed disk 22 so as to align the shaft 20 correctly with the center opening 22b of the internally toothed disk 22. Upon the alignment of the shaft 20 with the center opening 22b of the internally toothed disk 22, the end effector 10 moves the shaft 20 into the center openings 22b and 24b of the outermost internally toothed disk 22 and the externally toothed disk 24 adjacent to the outermost internally toothed disk 22.

The force controller 1 and the servo controller 5 of the control unit 14 give compliance with respect to the x-axis and the y-axis perpendicular to the z-axis in which the shaft 20 is moved for insertion and make the end effector 10 produce a pressing force acting along the z-axis to press the shaft 20 against the internally toothed disk 22.

The control unit 14 moves the compliance center of the shaft 20 along the predetermined groping route with the shaft 20 pressed against the internally toothed disk 22 by a pressing force parallel to the z-axis applied thereto by the end effector 10. The shaft 20 gripped by the end effector 10 is moved radially outward repeatedly from a position member the center of the center opening 22b of the outermost internally toothed disk 22 in different phases in the xy plane to find a position where the splines 20a of the shaft 20 are able to engage the internal teeth 22a of the outermost internally toothed disk 22.

If the extremity of the shaft 20 is caught in the center opening 22b of the internally toothed disk 22 and the splines 20a of the shaft 20 engage irregularly with the internal teeth 22a of the internally toothed disk 22 while the shaft 20 is being moved for groping with its extremity pressed against the internally toothed disk 22, the shaft 20 drops into the center opening 22b of the internally toothed disk 22 by the agency of the compliance of the end effector 10. Since the shaft 20 is pressed in a direction parallel to the z-axis by the pressing force of the end effector 10, the internally toothed disk 22 is translated in the xy plane by a force corresponding to the inclination of the shaft 20, the attitude of the shaft 20 is corrected and the shaft 20 is inserted in the center opening 22b of the internally toothed disk 22. The position of the end effector 10 in the xy plane may be adjusted according to the inclination of the shaft 20.

Thus, the shaft 20 is moved through the center opening 22b of the outermost internally toothed disk 22 until the extremity of the shaft 20 comes into contact with the second outermost internally toothed disk 22.

Subsequently, the next grouping cycle is executed. The control unit 14 makes the end effector 10 press the shaft 20 engaging the outermost internally toothed disk 22 in a direction parallel to the z-axis and move the compliance center of the shaft 20 along the predetermined groping route to grope for a position where the splines 20a of the shaft 20 is able to engage the internal teeth 22a of the second outermost internally toothed disk 22. Thus, operations for finding the position where the splines 20a of the shaft 20 are able to engage the internal teeth 22a of the internally toothed disk 22 and for pressing the shaft 20 into the center opening 22b of the internally toothed disk 22 are repeated for all the internally toothed disks 22 to assemble the multiple disk clutch.

Upon the engagement of the shaft 20 with all the internally toothed disks 22, the comparator 8 decides that the position of the extremity of the shaft 20 on the z-axis is near the final desired position $z_{tv}$ and the control unit 14 ends the assembling work.

If the the shaft 20 stays at the same z position on the z-axis for the predetermined time $t_{th}$, it is possible that the shaft 20 is stuck on the internally toothed disk 22 and the internally toothed disk 22 is moving together with the shaft 20. In such a case, the comparator 8 decides that the z position on the z-axis of the shaft 20 does not change for the predetermined time $t_{th}$ (dz≈0) and the control unit 14 instructing the force controller 1 to reduce the pressing force parallel to the z-axis for a predetermined time. Consequently, the shaft 20 is separated temporarily from the internally toothed disk 22 and then the groping operation of the end effector 10 is resumed. Thus, the position where the shaft 20 is able to be inserted in the center opening 22b of the internally toothed disk 22 can be easily found.

The control unit 14 may control the end effector 10 so as to turn the shaft 20 gripped thereby periodically to correct the angular dislocation of the splines 20a of the shaft 20 from a correct angular position where the splines 20a are aligned with the grooves between the internal teeth 22a of the internally toothed disk 22, respectively. Thus, the position where the splines 22a of the shaft 20 can be more precisely aligned with the grooves between the internal teeth 22a of the internally toothed disk 22.

Figure 4:
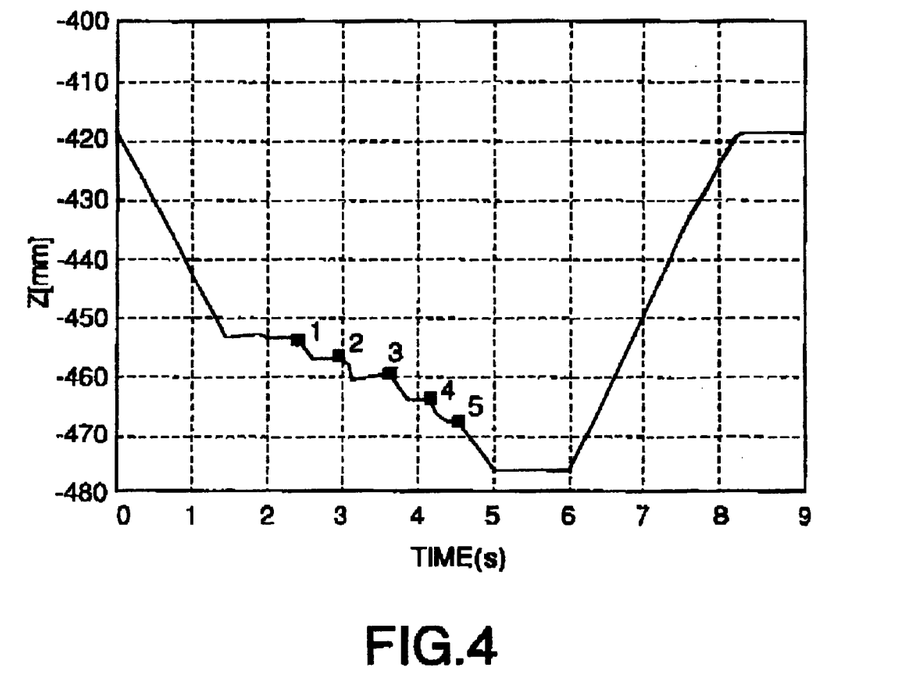
FIG. 4 is a graph showing the result of the assembling operation of the automatic position-finding assembling apparatus shown in FIGS. 1 to 3.

FIG. 4 is a graph of assistance in explaining the result of the assembling operations of the automatic position-finding assembling apparatus 13 shown in FIGS. 1 to 3 for assembling a multiple disk clutch provided with five internally toothed disk 22, in which time is measured on the horizontal axis and z position on the z-axis of the shaft 20 is measured on the vertical axis. As obvious from FIG. 4, the shaft 20 gripped by the end effector 10 came into contact with a first internally toothed disk 22 at a distance of about −453 mm from the reference position, engaged the first internally toothed disk 22 after a groping operation of about one second and was advanced toward a second internally toothed disk 22. The shaft 20 engaged all the five internally toothed disk 22 and the assembling work was completed in about four seconds.

Although the invention has been described as applied to assembling the multiple disk clutch by way of example, the present invention is not limited in its practical application to the foregoing embodiment; the automatic position-finding assembling apparatus is applicable to assembling an optional assembly by inserting insert members in the mating openings of receiving members.

Although the foregoing embodiment of the present invention gives compliance to the end effector 10 through a compliance control (execution of a control algorithm by the control unit), compliance may be given to the end effector by providing the end effector 10 with a mechanical compliance mechanism.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An automatic position-finding assembling method for inserting an insert member held by an end effector of an assembling robot into a mating opening of a receiving member to assemble a predetermined assembly, said automatic position-finding assembling method comprising the steps of:

positioning the insert member relative to the mating opening of the receiving member by moving the insert member held by the end effector relative to the receiving member; and pressing the insert member against the receiving member by a pressing force applied to the insert member in a direction parallel to a third axis by the end effector compliant with respect to directions parallel to first and second axes perpendicular to the third axis;

wherein in the step of pressing the insert member against the receiving member, a compliance center of the insert member is moved along a predetermined groping route with the pressing force applied to the insert member in the direction parallel to the third axis by the end effector; and wherein the groping route is set for repetition of a radially outward movement from a position near a center of the mating opening of the receiving member in different phases in a plane defined by the first and the second axes.

2. The automatic position-finding assembling method according to claim 1, wherein the groping route is a cloverleaf route expressed by the following expressions representing x and y coordinates on a plane defined by the first axis as x-axis and the second axis as y-axis:

$$x = A_x \{\sin(\omega t) + \sin(n\omega t)\}$$

$$y = A_y \{\cos(\omega t) \pm \cos(n\omega t)\}$$

where $A_x$ and $A_y$ are amplitudes (leaf size), n is a real number (relating to number of leaves), ω is a velocity of groping motion and t is time.

3. The automatic position-finding assembling method according to claim 1, wherein the pressing force produced by the end effector is reduced temporarily during the movement of the compliance center of the insert member along the groping route in the step of pressing the insert member against the receiving member.

4. The automatic position-finding assembling method according to claim 1, wherein the insert member held by the end effector is rotated periodically about its axis in the step of pressing the insert member against the receiving member.

5. The automatic position-finding assembling method according to claim 1, wherein the compliance is exercised through a compliance control of the end effector.

6. The automatic position-finding assembling method according to claim 1, wherein the insert member is a shaft having engaging portions formed on its outer circumference, the receiving member includes a plurality of plate-shaped members each having a center opening provided on its circumference with engaging portions mating with the engaging portions of the shaft, and the plurality of plate-shaped members are arranged with the center openings thereof aligned with each other.

7. An automatic position-finding assembling apparatus for inserting an insert member into mating opening of a receiving member by an assembling robot to assemble a predetermined assembly, said automatic position-finding assembling apparatus comprising:

an end effector for holding the insert member; and a control unit for controlling operations of the end effector so that the insert member held by the end effector is inserted in the mating opening of the receiving member;

wherein the control unit gives the end effector compliance with respect to directions parallel to first and second axes perpendicular to a third axis extending in a direction in which the insert member is moved for insertion, and a compliance center of the insert member is moved along a predetermined groping route with a pressing force applied to the insert member in the direction parallel to the third axis by the end effector; and wherein the groping route is set for repetition of a radially outward movement from a position near a center of the mating opening of the receiving member in different phases in a plane defined by the first and the second axes.

8. The automatic position-finding assembling apparatus according to claim 7, wherein the groping route is a cloverleaf route expressed by the following expressions representing x and y coordinates on a plane defined by the first axis as x-axis and the second axis as y-axis:

$$x = A_x \{\sin(\omega t) + \sin(n\omega t)\}$$

$$y = A_y \{\cos(\omega t) \pm \cos(n\omega t)\}$$

where $A_x$ and $A_y$ are amplitudes (leaf size), n is a real number (relating to number of leaves), $\omega$ is a velocity of groping motion and t is time.

9. The automatic position-finding assembling apparatus according to claim 7, wherein the control unit reduces the pressing force produced by the end effector temporarily during the movement of the compliance center of the insert member along the groping route.

10. The automatic position-finding assembling apparatus according to claim 7, wherein the control unit rotates the insert member held by the end effector periodically about its axis.

11. The automatic position-finding assembling apparatus according to claim 7, wherein the control unit controls the end effector to give the end effector compliance.

12. The automatic position-finding assembling apparatus according to claim 7, wherein the insert member is a shaft having engaging portions formed on its outer circumference, the receiving member includes a plurality of plate-shaped members each having a center opening provided on its circumference with engaging portions mating with the engaging portions of the shaft, and the plurality of plate-shaped members are arranged with the center openings thereof aligned with each other.

* * * * *

UNITED STATES PATENT AND TRADEMARK OFFICE
CERTIFICATE OF CORRECTION

PATENT NO. : 6,701,196 B2
DATED : March 2, 2004
INVENTOR(S) : Toshiyuki Itoko et al.

It is certified that error appears in the above-identified patent and that said Letters Patent is hereby corrected as shown below:

<u>Title page,</u>
Item [73], Assignee, should read as follows:
-- [73] Assignee: Kawasaki Jukogyo Kabushiki Kaisha, Kobe (JP) --

Signed and Sealed this

Eighteenth Day of May, 2004

JON W. DUDAS
*Acting Director of the United States Patent and Trademark Office*